Figure 1:
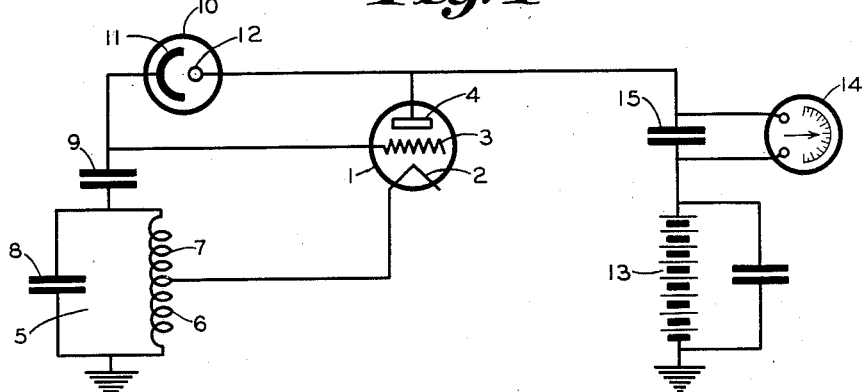

Nov. 30, 1937.    F. H. SHEPARD, JR    2,100,755
PHOTOMETER
Filed May 10, 1935

INVENTOR
FRANCIS H. SHEPARD JR
BY
Charles McClair
ATTORNEY

Patented Nov. 30, 1937

2,100,755

UNITED STATES PATENT OFFICE 2,100,755

PHOTOMETER

Francis H. Shepard, Jr., Rutherford, N. J., assignor, by mesne assignments, to Radio Corporation of America, a corporation of Delaware Application May 10, 1935, Serial No. 20,706

2 Claims. (Cl. 250—41.5)

This invention relates to methods and means for measuring light intensities and more particularly to phototube relays and photometers.

Photometers are known in which a phototube having an anode and light-responsive cathode sealed in an envelope measures light by the current which flows thru the phototube in response to light falling upon the light-responsive cathode. In practice it is necessary to have a load impedance in the output circuit of the phototube, and usually the phototube current is measured by a relay connected in series or across the load impedance. Unfortunately, a load impedance reduces the sensitivity of the phototube, and renders the photometer unstable and difficult to calibrate.

It is accordingly an object of my invention to devise a photometer which is sensitive yet stable in operation, and which is easy to calibrate.

A further object of my invention is to provide a photometer which is accurate over a wide range of light intensities, will respond to small percentage changes in light at any level of intensity from near-darkness to maximum levels of illumination, and will record or directly indicate the light in any desired terms, such as lumens.

It is a still further object of my invention to construct a photometer which may linearly respond to changes in light intensity over the entire range of light intensities, thus giving a reading directly proportional to the measured intensity of illumination.

The photometer constructed in accordance with my invention comprises essentially a phototube, an oscillator of the relaxation type and a sensitive meter to indicate the output of the oscillator. The oscillator may utilize any suitable type of electron discharge tube, but I prefer to use an oscillator comprising a tube such as a triode with a conventional tank circuit coupled between the input and output circuits, and with a condenser connected between the grid of the tube and the tank circuit. Assuming the grid is "free" it will gradually accumulate during a series of oscillations a negative charge which, after a finite time, will be of such a value as to block further oscillations. The tube remains blocked until sufficient current leaks thru the grid condenser and associated circuits to relieve the negative charge upon the grid and allow the resumption of oscillations. In accordance with my invention a light controlled resistance or impedance is connected to the relaxation oscillator such, for example, as a phototube, with the cathode of the phototube connected to the grid of the oscillator tube, and the anode of the phototube connected to ground or to a point of positive potential. Thus connected, the conductance of the phototube, which is a function of light intensity upon the photocathode, may be made to control the rate of discharge of the negative charge upon the grid. Since the frequency of relaxation of the oscillator is a function of the rate of charge and discharge of the grid of the oscillator tube, the intensity of illumination upon the phototube may be made to control the frequency of relaxation. A recording or indicating relay, such as a vacuum tube voltmeter or sensitive milliammeter, may be connected in the output circuit of the oscillator to quantitatively integrate and show the frequency of relaxation, hence said relay may give a direct reading of the level of illumination upon the phototube.

Figure 2:
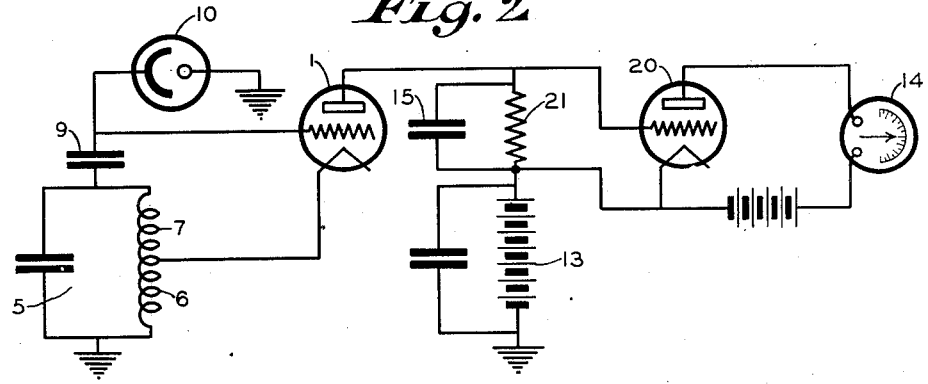
Figure 3:
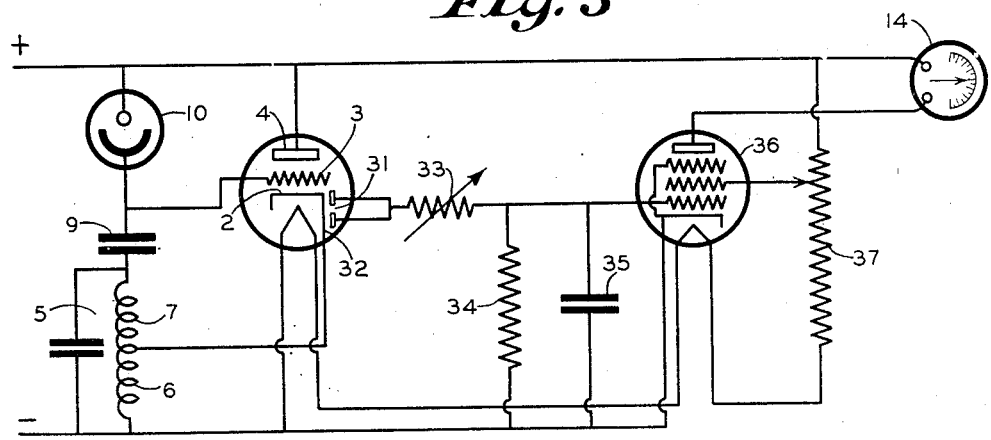

A fuller understanding of my invention may be had by referring to the accompanying drawing in which Figure 1 is a schematic representation of a photometer embodying my invention, and Figures 2 and 3 are modifications of my improved photometer. Like parts are indicated by similar reference characters thruout the several figures.

Figure 1 shows an oscillator comprising a triode 1 with a filamentary or indirectly heated cathode 2, grid 3 and plate 4, and connected to an oscillatory tank circuit 5 with coupled plate and grid coils 6 and 7 respectively. A condenser 8 connected in shunt to the coils 6 and 7 may be adjusted to cause oscillations of any desired frequency, for example, of superaudible frequency. As distinguished from the usual oscillator, grid 3 is coupled to one end of the tank circuit thru a grid condenser 9. It will be seen that by these connections of the grid and plate circuits to the tank 5 there exists the necessary phase displacement between the alternating current energization of the grid and plate to cause oscillations. With no static bias upon the grid the grid will gradually assume a negative potential because of grid current which as the oscillations continue will reach a value sufficient to block the tube 1 and cut off the flow of plate current and thus stop oscillations. The time required for the blocking negative potential upon the grid to leak off is determined by the leakage paths thru the grid condenser and over the internal and external surfaces of the bulb of the oscillator tube. As soon as the negative charge on the grid is reduced sufficiently to allow the flow of plate current, the tube begins again to oscillate, the grid and condenser again charge negatively and the cycle of blocking and resumption of oscillations is repeated. The rate of recurrence of these groups of oscillations hereinafter referred to as group frequency or frequency of relaxation, is accordingly determined by the time constant of the capacity and leakage resistance of grid condenser 9.

A relaxation oscillator constructed in accordance with my invention may conveniently be modulated as to frequency of relaxation by modulating the rate of discharge of the grid condenser. The rate of discharge of grid condenser 9 may be controlled by a phototube 10 with light responsive cathode 11 and anode 12 connected as shown between the grid and a point of positive potential which conveniently may be the anode. It is apparent that the level of illumination upon the photocathode may control the current thru the path between the grid side of the condenser 9 and the point of positive potential. The level of illumination upon the photocathode, hence, controls the time constant of the grid circuit which in turn controls the frequency of relaxation.

In the output circuit of oscillator tube 1 is connected a conventional source 13 of plate power and a sensitive current measuring meter 14, such for example as a milliammeter. Shunting the terminals of the meter is a high frequency by-pass condenser 15. In the plate circuit of the oscillator tube flows a composite wave of alternating current consisting of high frequency oscillations flowing in bursts or groups at the frequency of relaxation. The direct current component of the current in the plate circuit includes recurring impulses in synchronism with the groups of high frequency oscillations which serve to deflect the needle of the meter, the deflection being proportional to the frequency of the direct current impulses. With the load impedance of substantially infinite value across the terminals of the phototube, the conductivity of the leakage path thru the phototube may be substantially proportional to light over a wide range of light intensities. The needle deflection of the meter is accordingly proportional to any intensity of light upon the phototube.

As shown in Figure 2 the phototube may, optionally, be connected between the grid of the oscillator tube and ground, as comparatively low values of potential upon the grid are sufficient to operate the phototube. The device of Figure 2 is further modified by connecting meter 14 thru any suitable relay, such as a triode 20, to a load impedance 21 in the plate circuit of the oscillator. The operation of my device shown in Figure 2 is in all essentials the same as my circuit shown in Figure 1, with the phototube 10 serving to control the time constant of the relaxation controlling condenser 9.

In Figure 3 an oscillating triode is shown incorporated in an envelope with a rectifying diode 31—32. The triode section of the tube oscillates as in Figures 1 and 2 with the phototube 10 connected between the grid condenser and the plate supply. The alternating current potential across the plate winding 6 of the tank circuit is impressed between the cathode 32 and plate 31 of the diode, the circuit connections being completed thru adjustable resistor 33 and coupling impedance 34. The oscillatory voltage of the tank circuit is thus rectified by the diode section 31—32 of the tube to charge condenser 35 in proportion to the amplitude and frequency of the groups of oscillation of the triode section of the tube. The charge on condenser 35 is thus proportional to the frequency of relaxation which, as in Figures 1 and 2, is proportional to the light on the phototube. The charge upon condenser 35 is impressed upon the input electrodes of relay 36, which by way of example has been shown as a pentode. The cathode heating elements of the pentode and diode-triode may conveniently be connected in series with resistor 37 across the plate source and the output of the pentode may, as in the modifications of Figures 1 and 2, be connected thru a current meter 14.

It will now be appreciated that I have provided a device in which the value of an unknown light source may be quickly and accurately determined merely by exposing the phototube 10 to said source. The circuit is of great sensitivity and susceptible to relatively small changes in light, and hence insures an accurate and precise determination. The device may be made up so as to include a current meter with a dial, specially calibrated in lumens or any desired unit of light intensity. In one photometer constructed as shown in Figure 3, the resistances 33, 34 and 37 were respectively adjusted at 250,000 ohms, 2 megohms and 280 ohms, while condensers 9 and 35 were chosen respectively as 50 micro-microfarads and .5 microfarad. The phototube used was of the form known as type "917", the diode-triode as type "85" and the pentode as type "43". The values of inductances 6—7 and condenser 8 of the tank circuit were chosen to produce 475 kilocycles per second with good results. I have found in practice that none of the above mentioned circuit parameters are critical in value. The values mentioned are accordingly given merely as an example of one form of photometer and are not to be construed as limiting. It has been found, further, that the plate current supply for the oscillator may conveniently be alternating current instead of direct current as shown in the drawing. Alternating current plate supply for the oscillator merely superimposes a 60 cycle modulation upon the generated oscillations in the output of the oscillator, and in no way affects the calibration of the photometer.

While I have indicated the preferred embodiments of my invention of which I am now aware and have also indicated only three specific forms in which my invention may be employed, it will be apparent that my invention is in no way limited to the exact forms illustrated or to the use indicated but that many variations may be made in the particular connections used and the purpose for which it is employed without departing from the scope of my invention as set forth in the appended claims.

I claim:

1. In a photometer, a relaxation oscillator with a control electrode cathode, and anode, an oscillatory tank circuit comprising a parallel condenser and inductance with an intermediate point of the inductance connected to said cathode, one end coupled to said anode and the other end of said inductance coupled through a condenser to said electrode, a light controlled impedance connected to the control electrode of said oscillator for controlling the frequency of relaxation, and means in said output circuit for quantitatively translating said frequency of relaxation to indicate the conductivity of said impedance.

2. In a photometer, an oscillator comprising an electron discharge device and inductively coupled grid and plate coils coupled, respectively, to the grid and plate electrodes of said discharge device, a condenser in the coupling between said grid and grid coil, a phototube cathode connected to said grid, a diode rectifier in series with a resistance connected across said plate coil, and an electrical measuring device coupled across said resistance.

FRANCIS H. SHEPARD, JR.